United States Patent [19]

McNaughton et al.

[11] Patent Number: 5,261,709
[45] Date of Patent: Nov. 16, 1993

[54] QUICK CONNECTOR

[75] Inventors: James McNaughton, Rochester Hills; Mark G. Ketcham, Marine City, both of Mich.

[73] Assignee: Huron Products Industries, Inc., New Haven, Mich.

[21] Appl. No.: 997,659

[22] Filed: Dec. 29, 1992

Related U.S. Application Data

[63] Continuation of Ser. No. 885,709, May 19, 1992, abandoned, which is a continuation of Ser. No. 610,817, Nov. 8, 1990, Pat. No. 5,135,268.

[51] Int. Cl.⁵ .............................................. F16L 33/18
[52] U.S. Cl. ..................................... 285/319; 285/351; 285/921; 285/239
[58] Field of Search ............... 285/239, 319, 351, 921, 285/348, 320; 72/88; 29/446, 453, 450

[56] References Cited

U.S. PATENT DOCUMENTS

| | | |
|---|---|---|
| 2,661,768 | 12/1953 | Novak et al. . |
| 2,915,325 | 12/1939 | Foster ............................ 285/319 X |
| 3,468,563 | 9/1969 | Duret . |
| 3,480,800 | 11/1969 | Jeffery et al. . |
| 3,526,417 | 4/1968 | Aumiller . |
| 4,035,005 | 7/1977 | DeVincent et al. . |
| 4,036,515 | 7/1977 | Karcher et al. ............... 285/319 X |
| 4,046,387 | 9/1977 | Lee . |
| 4,105,226 | 8/1978 | Frey et al. ..................... 285/319 X |
| 4,572,552 | 2/1986 | Orevik et al. . |
| 4,575,130 | 3/1986 | Pemberton et al. . |
| 4,610,468 | 9/1986 | Wood ............................. 285/319 X |
| 4,614,120 | 9/1986 | Fradin et al. . |
| 4,618,171 | 10/1986 | Fahl . |
| 4,637,640 | 1/1987 | Fournier et al. . |
| 4,659,119 | 4/1987 | Reimert . |
| 4,681,351 | 1/1987 | Bartholomew . |
| 4,703,957 | 11/1987 | Blenkush . |
| 4,749,214 | 6/1988 | Hoskins et al. . |
| 4,793,637 | 12/1988 | Laipply et al. ................. 285/319 X |
| 4,846,506 | 7/1989 | Bocson et al. ................. 285/319 X |
| 4,979,765 | 12/1990 | Bartholomew . |
| 5,064,227 | 11/1991 | Spurs et al. . |

FOREIGN PATENT DOCUMENTS 8403927 10/1984 PCT Int'l Appl. .
966842 8/1964 United Kingdom .

Primary Examiner—Dave W. Arola
Assistant Examiner—Heather Chun
Attorney, Agent, or Firm—Kinzer, Plyer, Dorn, McEachran & Jambor

[57] ABSTRACT

A connector assembly has a metallic female housing socket. The female housing socket has a pair of flanges substantially perpendicular to the axis of the socket to retain sealing rings and a conduit retainer within the socket. The socket also has one or more barb corners on its stem to enhance retention of a conduit onto the stem.

3 Claims, 1 Drawing Sheet

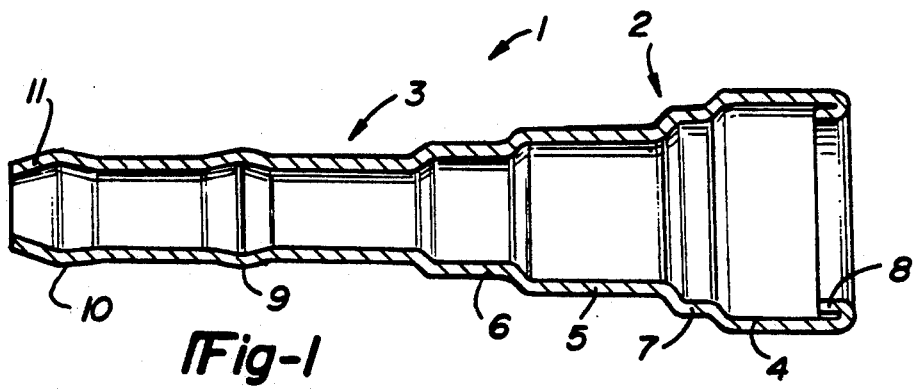
Fig-1
PRIOR ART
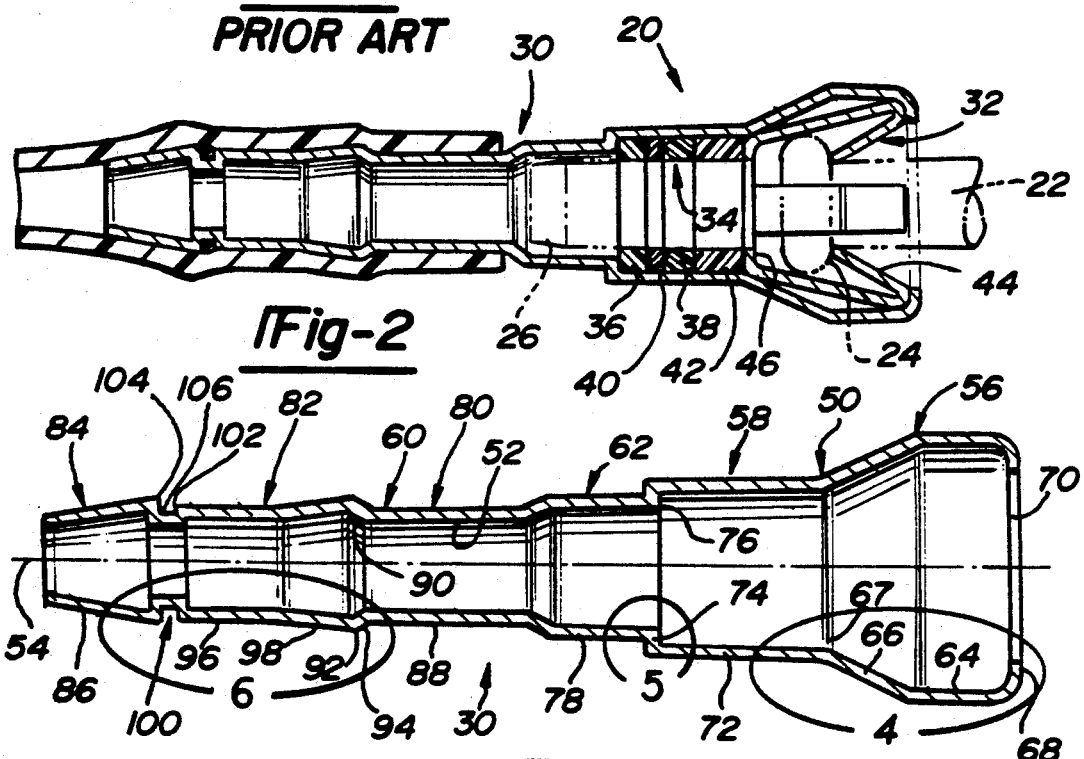
Fig-2
Fig-3
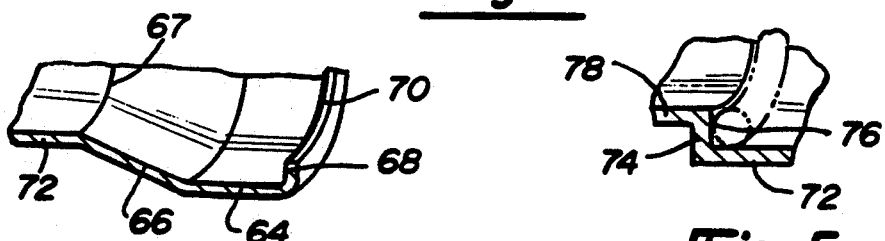
Fig-4
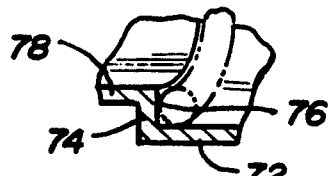
Fig-5
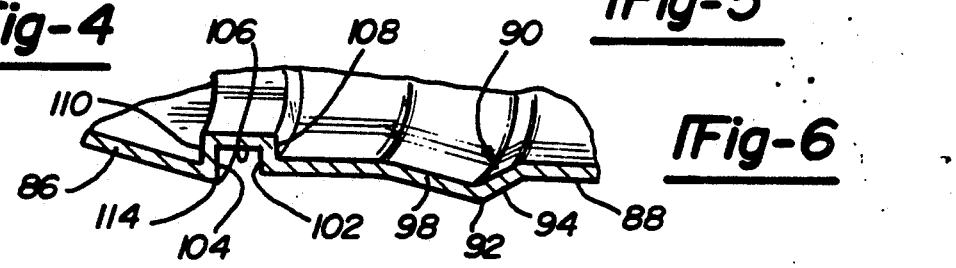
Fig-6

QUICK CONNECTOR

This is a continuation of co-pending application Ser. No. 07/885,709, filed May 19, 1992, now abandoned, which was a continuation of application Ser. No. 07/610,817 filed Nov. 8, 1990, issued as U.S. Pat. No. 5,135,268.

BACKGROUND AND SUMMARY OF THE INVENTION

The present invention relates to quick connectors and, more particularly, to female connector housings formed from metallic materials.

In manufacturing fields, such as automotive, trucks or the like, it is customary to employ quick connect devices to connect conduits or the like together. While conduits, such as piping can be connected in a variety of ways, which include threaded couplings for efficient assembly of the mechanisms, it is desirable to have available a fluid coupling which can be attached very expeditiously but which at the same time, once attached, is substantially fail safe. Various types of couplings have been provided to be utilized in connecting of conduits.

Turning to FIG. 1, a female housing socket which applicant has currently been using is illustrated as relevant art. The socket is designated with the reference numeral 1 and includes a body portion 2 and a stem portion 3. The body portion 2 includes a retainer housing portion 4, a sealing means housing portion 5 and a conduit tip housing portion 6. The retainer housing portion 4 and sealing means housing portion 5 are separated by a double step portion 7. Generally, the retaining housing portion 4, sealing means housing portion 5, conduit tip housing portion 6 and dual step portion 7 all include right cylindrical walls connected by curved inward flanges. The retaining housing portion 4 at its free end includes an inward turned flange 8 defining an opening to enable insertion of a conduit. The stem 3, generally formed from a cylindrical wall, has a pair of bulges, 9 and 10, the bulge 10 ending with a frustro-conical tip 11. While the socket 1 functions satisfactorily for its intended purpose, designers continue to strive to improve the art.

Accordingly, the present invention provides the art with an improved female housing socket. The present invention provides the art with a socket which requires less material to provide cost saving benefits. The present invention has an overall body length which is less than currently used sockets. The female socket also provides an abutting shoulder to reduce the displacement of O-rings during insertion of the conduit. The present invention provides barb corners on the stem and an annular groove to seat an O-ring to enhance sealing of a conduit to the stem.

From the following detailed description taken in conjunction with the accompanying drawings and subjoined claims, other objects and advantages will become apparent to those skilled in the art.

BRIEF DESCRIPTION OF THE DRAWINGS

FIG. 1 is a sectional view of a relevant art device.

FIG. 2 is a sectional view of a connector assembly in accordance with the present invention.

FIG. 3 is a sectional view of the female housing socket of FIG. 2.

FIG. 4 is an enlarged partial perspective sectional view of FIG. 3 within circle 4.

FIG. 5 is an enlarged partial perspective sectional view of FIG. 3 within circle 5.

FIG. 6 is an enlarged partial perspective sectional view of FIG. 3 within circle 6.

DETAILED DESCRIPTION OF THE PREFERRED EMBODIMENT

Referring to the figures, particularly FIG. 2, a connector assembly is illustrated in accordance with the present invention and designated with the reference numeral 20. The connector 20 includes a male conduit 22 with an annular bead 24 and a tip 26 and a female socket housing 30. The female socket housing 3 houses a retainer 32 which retains the annular bead 24 which, in turn, locks the conduit 22 within the housing 30. Also, a sealing means 34 is housed within the female socket 30. The sealing means 34 generally includes a pair of O-rings 36 and 38 and bushings 40 and 42. The retainer 32 includes a plurality of arms 44 and an annular ring 46 which define openings to enable passage of the conduit 22 therethrough as seen in FIG. 2.

Moving to FIG. 3, the female socket housing 30 is illustrated. The female socket housing includes a body portion 50 and a stem portion 60. An axial bore 52 passes through the body 50 and stem 60 defining an axis 54. The axial bore is continuous through the socket 30 and has enlarged diameter step portions which will be explained herein.

The body 50 includes a retainer housing portion 56, a sealing means housing portion 58 and a conduit tip housing portion 62. The retainer housing portion 56 includes a right cylindrical wall portion 64 continuous at one end with a frustro-conical shaped wall portion 66 defining an increased diameter portion of the axial bore 52. The other end of the right cylindrical wall portion 64 is continuous with a radially inward extending flange 68.

The flange 68 defines an opening 70 which enables passage of the conduit into the socket 30. The flange 68 in cross section is in a plane which is substantially perpendicular to the right cylindrical wall 64 and axis 54 as seen in FIG. 3. The flange 68 provides an abutting surface for the retainer 32 as can be seen in FIG. 2 to provide force against withdrawal of the retainer 32 to maintain the sealing means 34 and conduit 22 within the housing.

The frustro-conical shaped wall portion 66 has its larger end continuous with the cylindrical wall portion 64. The smaller end is continuous with the sealing means housing portion 58. The frustro-conical shaped wall portion 66 is at an acute angle with respect to the axis 54 from about 15 to about 20 degrees. The frustro-conical shaped portion provides for aligning the retainer 32 within retainer housing portion 56. Also, the frustro-conical shaped wall portion 66 enables the tooling and forming process to be simplified. Likewise, with the removal of the dual step portion, the connection of the smaller end of the frustro-conical shaped wall portion 66 with the sealing means housing wall portion 58 reduces the forming stress during manufacture of the socket. Also, the junction of the smaller end provides a uniform lip 67, which is in a plane perpendicular to the axis 54, to position the ring 46 of the retainer 32 within the housing as seen in FIGS. 3 and 4.

The sealing means housing portion 58 includes a right cylindrical wall 72 has its axis coincident with axis 54 and defines another enlarged diameter portion of the axial bore. One end of the wall 72 is continuous with the frustro-conical wall 66. The other end of the right cylindrical wall 72 includes a radially extending inwardly flange 74. The flange 74 is in a plane which is substantially perpendicular to the axis 54. The flange 74 forms a shoulder within the axial bore providing an abutment surface for the O-ring 36 as seen in FIG. 5. The substantially perpendicular flat planar abutment surface 76 reduces the incidence of displacing the O-ring as the conduit 22 is passed into the socket as seen in FIG. 2.

The conduit tip housing portion 62 includes a right cylindrical wall 78 continuous with the flange 74 and substantially perpendicular thereto. The wall 78 has an axis coincident with the axis 54 and defines another enlarged diameter portion of the axial bore. The wall 78 at its other end is continuous with the stem 60.

The stem 60 includes a first, second and third cylindrical wall portion 80, 82 and 84 with the first cylindrical wall portion 80 continuous with the conduit tip housing portion 62. The third cylindrical portion 84 is a frustro-conical shaped wall 86 which forms a tip at the free extending end of the stem 60 to enhance entrance of the socket 30 into a conduit. The first cylindrical portion 80 includes a right cylindrical wall 88 continuous at one end with the wall 78. The right cylindrical wall 88 is coincident with the axis 54. The other end of the right cylindrical wall 88 has a radially outward extending flange 90 continuous with the second stem portion 82.

The flange 90 is frustro-conically shaped forming an exterior shoulder or barb corner 92 at the junction of the first and second stem portions 80 and 82 as seen in FIG. 6. The barb 92 provides enhanced securement of the conduit secured onto the stem 60. The flange 90 has an exterior face 94 at an acute angle with respect to the axis 54.

The second stem portion 82 includes a right cylindrical wall portion 96 and a frustro-conical shaped wall portion 98. The frustro-conical shaped portion 98 has its larger end continuous with the flange 90 forming the barb 92 on the exterior of the socket. The smaller end of the frustro-conical shaped wall 98 is continuous with the right cylindrical wall 96. The right cylindrical wall portion 96 includes an annular groove 100 formed at its other end. The annular groove 100 is formed on the exterior surface of the socket 30 and has an overall U-shape in cross section as seen in FIGS. 3 and 6. The U is defined by sidewalls 102, 104 and web 106. The sidewalls 102 and 104 are substantially parallel to one another and perpendicular to the axis 54.

Sidewalls 102 and 104 are the exterior surfaces of radially inward flanges 108 and=110, which extend inwardly into the axial bore. The flange 110 with exterior wall 104 is continuous with the frustro-conical wall 86 of the third portion 84. The junction of the wall 104 and exterior of the wall 86 form a barb corner 114 for enhancing retention of a conduit on the socket 30. The annular groove 100 and flange 90 are formed by a roll formed method as will be explained herein.

The socket 30 is generally formed by the following process. A thin gage disk of metallic material is placed into an up set forming press. The press has a series of male punches and female tools. The disk is contacted by the first punch and tool and formed into a cup shape. The cup is moved sequentially through an automated process from punch to punch to form the socket 30. As the cup is sequentially passed through the automated process from punch to punch in the up set eyelet tooling, at one step the retaining portion 56 is formed, at another step, the sealing means housing portion 58 is formed, another step, the conduit tip housing portion 62 is formed, as additional steps are carried out, the stem is formed. As the steps continue, the flange 74 is formed. Towards the end of the process, as the stem is formed, bulges are formed in the socket at the area where the flange 90 and annular groove 100 are to be formed. During the sequential process, while the socket is withdrawn from a tool after forming of the bulges, the socket is roll formed by rollers to produce the barbed corner 92, annular groove 100 and barbed corner 114. This rolling process is performed during the sequential process to provide the socket with defined barbed corners which enhance the sealing of a conduit to the stem. The socket continues through its sequence of additional punch and eyelet tool steps to provide proper inside and outside diameter sizes. After the eyelet punching sequence is finished, the socket 30 in FIGS. 2–6 is formed from the process.

While the above detailed description provides a preferred embodiment of the present invention, it will be understood that the present invention is susceptible to modification, variation and alteration without deviating from the scope and true meaning of the subjoined claims.

What is claimed is:

1. A connector assembly comprising:
a male conduit having a radially outwardly extending annular bead;
a metallic female socket housing for receiving said male conduit, said female socket housing including a hollow thin walled body extending between a first and second end, and defining an axial bore extending along an axis through said body, said body including a retainer housing portion extending from said second end of said body towards said first end, said retainer housing portion having a cylindrical wall portion extending with inner and outer wall surfaces from said second end towards said first end, and a frusto-conical portion extending from said cylindrical wall portion at a first acute angle towards said first end, said frusto-conical portion also having a larger end continuous with said cylindrical wall portion, and a smaller end, said frusto-conical portion defining inner and outer frusto-conical shaped wall portions extending at the same angle; and
a retainer received within said retainer housing portion, said retainer having a generally frusto-conical shaped outer periphery and extending from said second end towards said first end at a second acute angle, said retainer also having a wide end and a narrow end, said wide end engaging an abutment at said second end of said body, and an annular ring formed at said narrow end having a diameter of approximately the same size as the diameter of said smaller end of said frusto-conical portion wherein the engagement of said annular ring to said narrow end align said retainer within said retainer housing portion and an arm extending at an acute angle from said wide end towards said first end having wide and narrow end portions, said male conduit received into said retainer such that said narrow end portion of said arm engages said annular bead to retain said male conduit in said female socket housing.

2. The connector assembly as recited in claim 1, wherein said abutment at said second end of said connector body is an inwardly-turned flange.

3. The connector assembly as recited in claim 1, further comprising a sealing means housing portion continuous with said retainer housing portion, said sealing means housing portion including a second cylindrical wall portion extending from said smaller end of said frusto-conical portion towards said first end of said body.

* * * * *